United States Patent [19]

Gilb

[11] Patent Number: 5,253,465
[45] Date of Patent: Oct. 19, 1993

[54] MULTIPLE FRAMING MEMBER CONNECTION

[75] Inventor: Tyrell T. Gilb, Berkeley, Calif.

[73] Assignee: Simpson Strong-Tie Company, Inc., San Leandro, Calif.

[21] Appl. No.: 841,422

[22] Filed: Feb. 26, 1992

[51] Int. Cl.⁵ ............................................... C04C 3/02
[52] U.S. Cl. ................................... 52/643; 52/648; 52/92.2; 52/655.1; 403/170; 403/232.1
[58] Field of Search .......... 52/643, 646, 698, 712-715, 52/90; 403/232.1, 171, 170, 230

[56] References Cited

U.S. PATENT DOCUMENTS

| | | | |
|---|---|---|---|
| 4,230,416 | 10/1980 | Gilb | 403/232.1 |
| 4,410,294 | 10/1983 | Gilb | 52/90 |
| 4,423,977 | 1/1984 | Gilb | 403/232.1 |
| 4,480,941 | 11/1984 | Gilb et al. | 403/232.1 |
| 4,572,695 | 2/1986 | Gilb | 403/232.1 |
| 4,717,279 | 1/1988 | Commins | 403/232.1 X |
| 4,817,359 | 4/1989 | Colonias | 52/643 |
| 4,890,436 | 1/1990 | Colonias | 52/643 |
| 4,897,979 | 2/1990 | Colonias | 52/643 |
| 4,964,253 | 10/1990 | Loeffler | 52/289 |
| 5,042,217 | 8/1991 | Bugbee | 52/643 |

OTHER PUBLICATIONS

Page f/Cleveland Steel Specialty Co. catalog copyright 1986.
Lumberlok catalog, cover page and p. 37.

Primary Examiner—Carl D. Friedman
Assistant Examiner—Beth A. Aubrey
Attorney, Agent, or Firm—James R. Cypher

[57] ABSTRACT

A multiple truss connection in which one or two trusses, such as a right hip truss and a jack truss, or a left hip truss and a jack truss, or two hip trusses are connected to a supporting girder by means of a sheet metal hanger. The sheet metal hanger is constructed from a single sheet metal blank in which no welding is required. The sheet metal hanger includes a seat member, first and second backwall members which are connected to the supporting girder and first and second side members connected to the supported trusses. A flange member integrally connected to the seat provides further connection when a jack truss is supported. The identical sheet metal hanger can also be used in a multiple framing member connection in which the wood members are standard lumber rather than trusses.

8 Claims, 4 Drawing Sheets

MULTIPLE FRAMING MEMBER CONNECTION

BACKGROUND

This invention relates to a multiple framing member connection and a sheet metal hanger for effecting the connection. The framing members may be either standard dimension lumber or wood trusses and truss girders. Specifically, the connection is most typically made at the juncture of the supporting truss girder or framing header and one or two hip framing members or wood trusses or a hip truss or wood framing member and a jack framing member or jack truss.

Prior art U.S. Pat. No. 4,817,359 Apr. 4, 1989, Colonias teaches a sheet metal connector for connecting multiple truss connections. The Colonias, U.S. Pat. No. 4,817,359 structure, however, can not be used to connect a right hip truss and a jack truss and then be interchangeably used to connect a left hip truss and a jack truss.

Another limitation of Colonias, U.S. Pat. No. 4,817,359 is that the sheet metal connector cannot be used to connect two hip trusses to a support girder. Moreover, the sheet metal hanger taught by Colonias, U.S. Pat. No. 4,817,359 cannot be installed if the hip and jack truss have already been temporarily affixed to the support girder in the installation procedure.

Prior art Loeffler, U.S. Pat. No. 4,964,253 is capable of being installed after the hip and jack truss have been temporarily fastened to the supporting girder. Loeffler, however, has three design weaknesses which are met by the the present invention.

First, Loeffler ('253) provides greater load and uplift holding to the more lightly loaded jack truss and perversely provides less load holding and uplift resistance to the more heavily loaded hip truss. The sheet metal hanger of this application judiciously provides maximum holding resistance for the more heavily loaded hip trusses.

Second, Loeffler ('253) has a wide seat member which weakens the holding ability of the sheet metal hanger to hold the large loads as opposed to the present invention which has a narrower seat member.

Third, Loeffler ('253) cannot carry two hip trusses whereas the present sheet metal hanger can accommodate two hip trusses quite readily.

SUMMARY OF THE INVENTION

The multiple framing member or truss connection of the present invention using a single sheet metal hanger as described is capable of making three separate connections: viz.; (A). joining to a support girder, (1) a right hip truss and a jack truss, (2) a left hip truss and a jack truss, or (3) a right and left hip truss; or (B) joining to a support header, (1) a right hip framing member and a jack framing member, (2) a left hip framing member and a jack framing member, or (3) a right and left hip framing member.

Another advantage of the present invention is that it may be installed after the wood framing members or trusses have been temporarily affixed to the support header or support girder.

Finally, as stated above, the sheet metal hanger of the present invention presents greater holding for the hip truss than the jack truss.

DESCRIPTION OF THE PREFERRED EMBODIMENTS OF THE INVENTION

Figure 1:
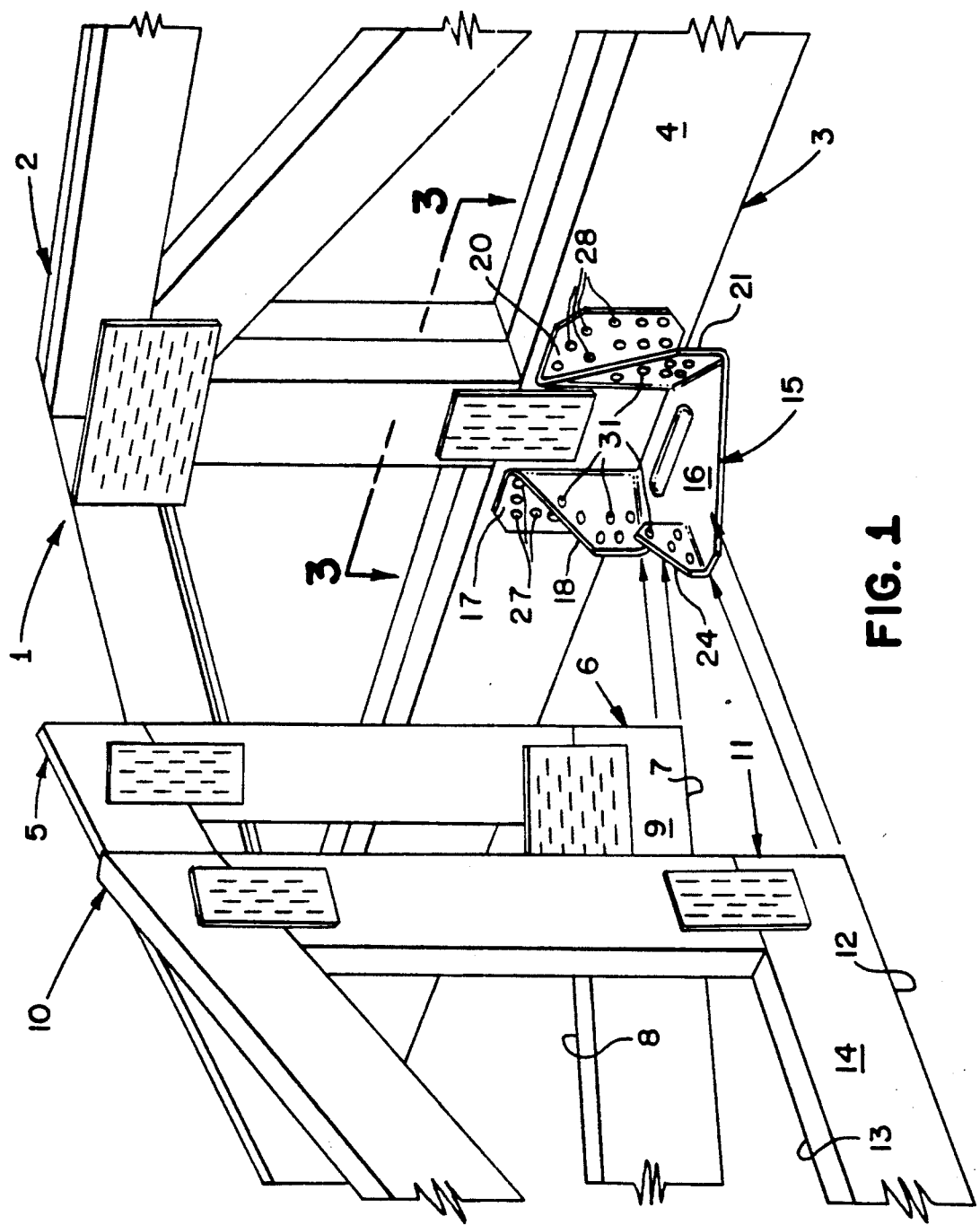
FIG. 1 is a perspective view of the multiple framing member connection of the present invention.
Figure 2:
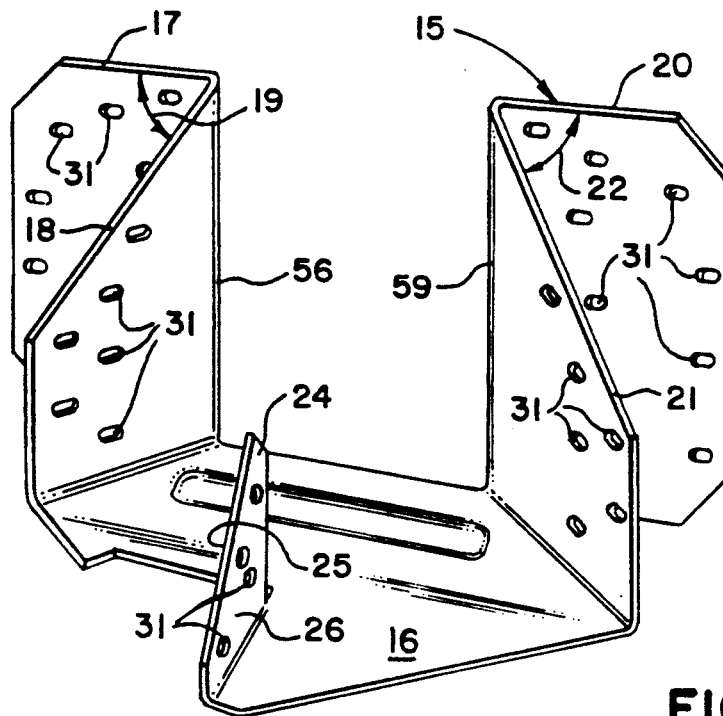
FIG. 2 is a perspective view of the sheet metal hanger included in the multiple framing member connection of the present invention illustrated in FIG. 1.
Figure 3:
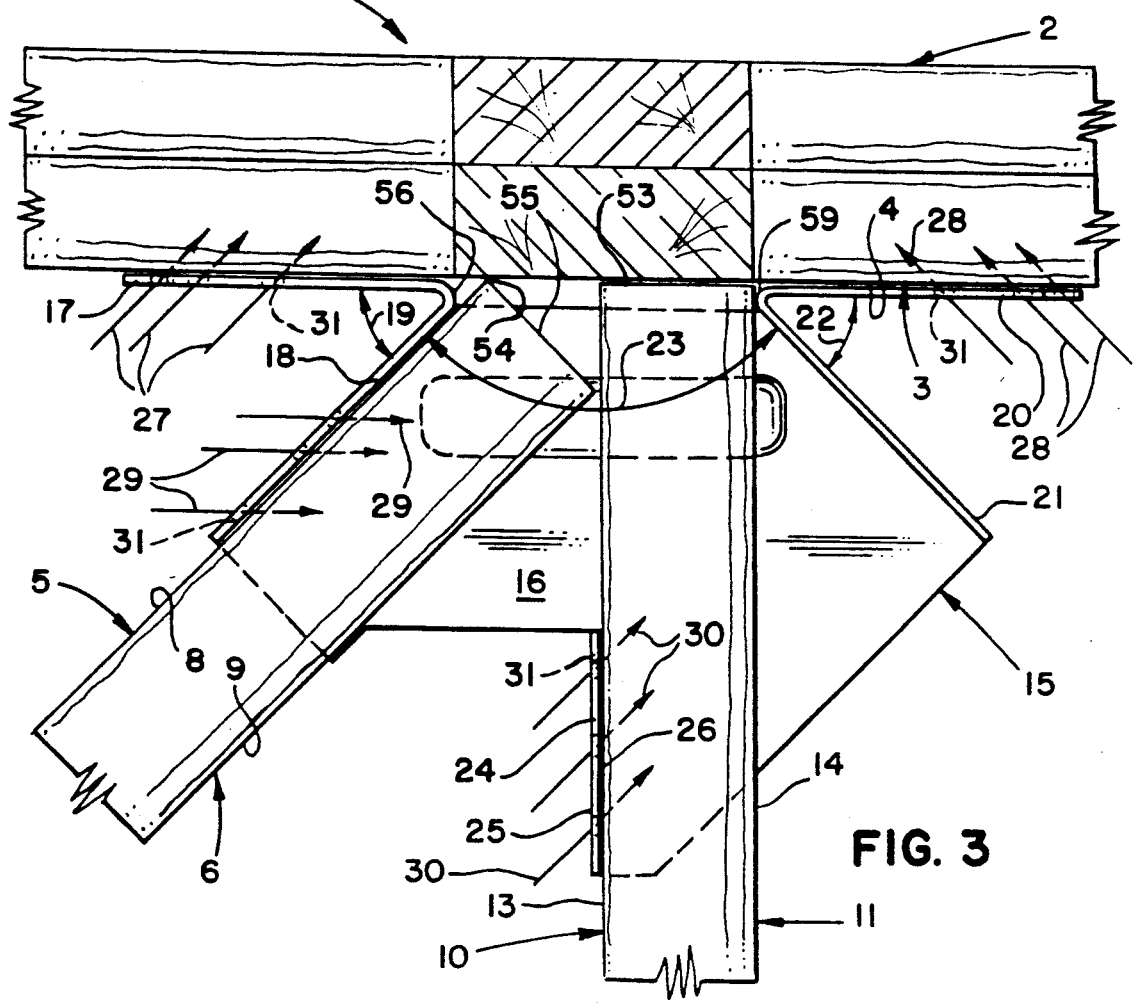
FIG. 3 is a top plan view of a portion of the multiple framing member connection taken generally along line 3—3 of FIG. 1 and illustrating a first hip truss and a first jack truss connected by a sheet metal hanger of the present invention illustrated in FIG. 2.

The present invention as illustrated in FIGS. 1 and 3 is a multiple truss connection 1 including: a support girder 2 including a wood bottom chord 3 having a front face 4; a first hip truss 5 including a wood bottom chord 6 having a bottom edge 7 and parallel first and second sides 8 and 9; a first jack truss 10 including a wood bottom chord 11 having a bottom edge 12 and parallel first and second sides 13 and 14; and a a sheet metal hanger 15.

Sheet metal hanger 15 includes: a seat member 16 for receiving the bottom edges 7 and 12 of the first hip truss 5 and the first jack truss 10; a first backwall member 17 in registration with the front face 4 of the support girder 2; a first side member 18 integrally connected to the first backwall member 17 at an acute angle 19 and integrally connected to the seat member 16, and disposed for registration with the first side 8 of the first hip truss 5; a second backwall member 20 spaced from the first backwall member 17 in registration with the front face 4 of the support girder 2; a second side member 21 integrally connected to the second backwall member 20 at an acute angle 22 and at an obtuse angle 23 with the first side member 18 and integrally connected to the seat member 16; and a flange member 24 having first and second faces 25 and 26 integrally connected to the seat member 16 and extending upwardly therefrom and located for registration of the second face 26 with the first side 13 of the first jack truss 10.

First fasteners 27 inserted through the first backwall member 17 into the support girder 2; second fasteners 28 inserted through the second backwall member 20 into the support girder 2; third fasteners 29 inserted through the first side member 18 into the first hip truss 5; and fourth fasteners 30 inserted through the flange member 24 into the first jack truss 10 complete the multiple truss connection 1.

For ease in making the installation, fastener opening means 31 are formed in the first backwall member 17, the first side member 18, the second backwall member 20, and the flange member 24 for permitting slant angle fastening.

Figure 4:
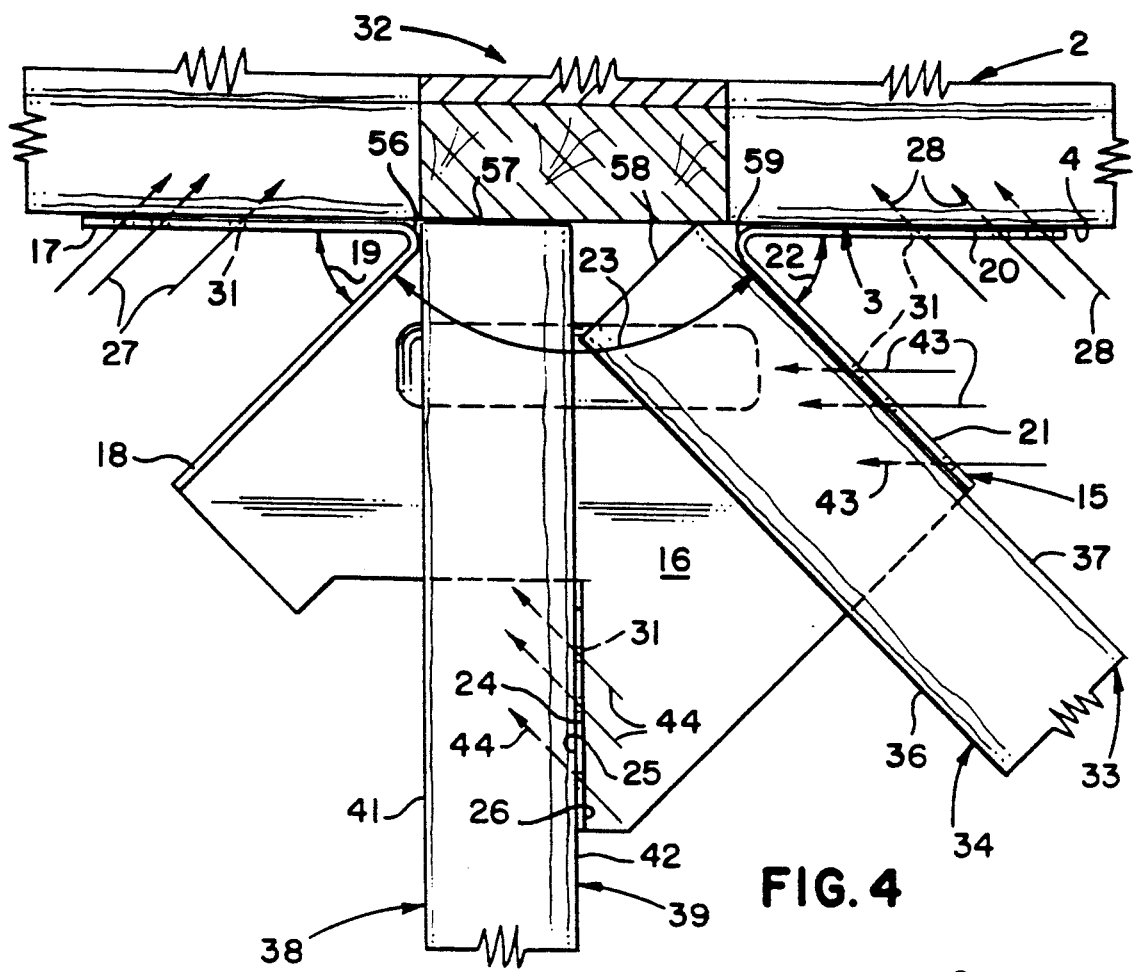
FIG. 4 is a top plan view of a portion of another form of the multiple framing member connection of the present invention showing the sheet metal hanger illustrated in FIG. 2. The view is similar to that shown in FIG. 3 taken along line 3—3 of FIG. 1 except that a second hip truss and a second jack truss are illustrated.

Another multiple truss connection 32 is illustrated in FIG. 4 comprising: a support girder 2 including a wood bottom chord 3 having a front face a second hip truss 33 including a wood bottom chord 34 having a bottom edge 35 and parallel first and second sides 36 and 37; a second jack truss 38 including a wood bottom chord 39 having a bottom edge 40 and parallel first and second sides 41 and 42; and a sheet metal hanger 15.

Sheet metal hanger 15 includes: a seat member 16 for receiving the bottom edges 35 and 40 of the second hip truss 33 and the second jack truss 38, a first backwall member 17 in registration with the front face 4 of the support girder 2, a first side member 18 integrally connected to the first backwall member 17 at an acute angle 19 and integrally connected to the seat member 16, a second backwall member 20 spaced from the first backwall member 17 in registration with the front face 4 of the support girder 2, a second side member 21 integrally connected to the second backwall member 20 at an acute angle 22 and at an obtuse angle 23 with the first side member 18 and integrally connected to the seat member 16 and disposed for registration with the second side 37 of the second hip truss 33, and a flange member 24 having first and second faces 25 and 26 integrally connected to the seat member 16 and extending upwardly therefrom and located for registration of the first face 25 with the second side 42 of the second jack truss 38.

First fasteners 27 inserted through the first backwall member 17 into the support girder 2; second fasteners 28 inserted through the second backwall member 20 into the support girder 2; sixth fasteners 43 inserted through the second side member 21 into the second hip truss 33; and fifth fasteners 44 inserted through the flange member 24 into the second jack truss 38 complete the multiple truss connection 32.

Multiple truss connection 32 also includes fastener opening means 31 formed in the first backwall member 17, the second side member 21, the second backwall member 20, and the flange member 24 for permitting slant angle fastening.

Figure 5:
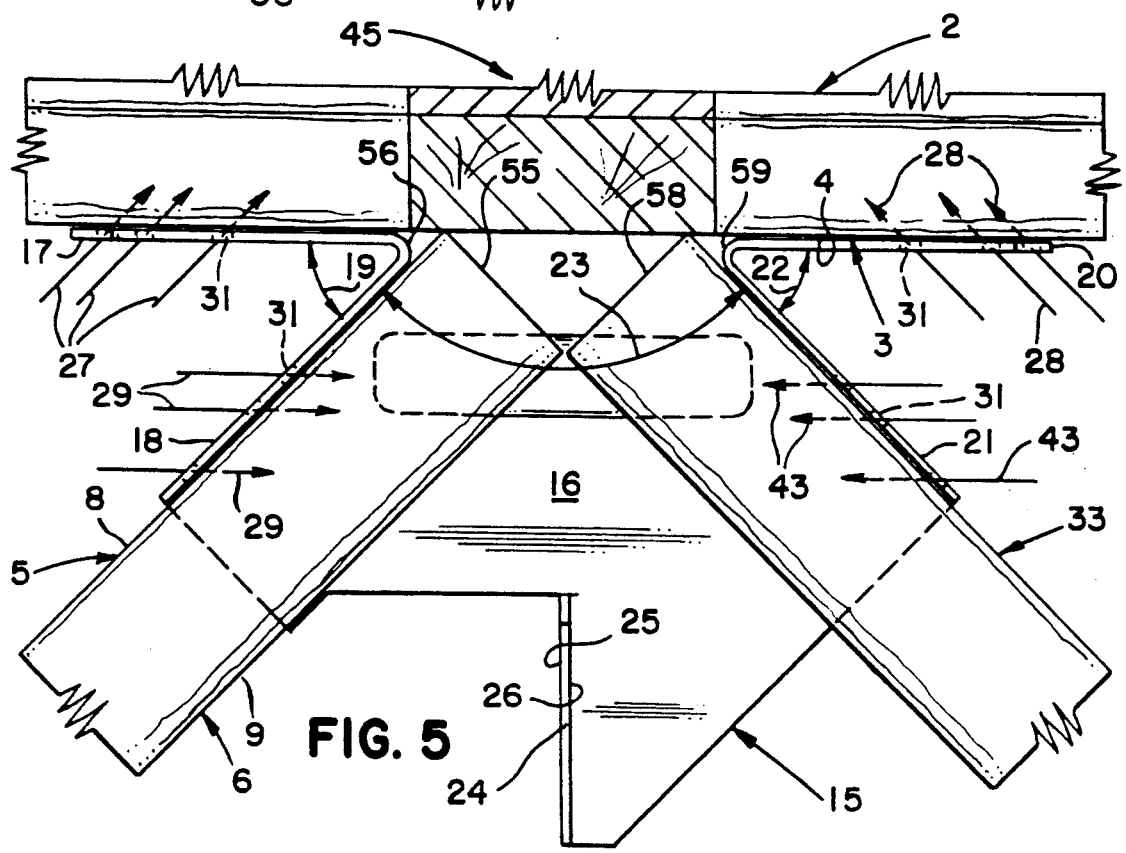
FIG. 5 is a top plan view of a portion of still another form of the multiple framing member connection of the present invention showing the sheet metal hanger illustrated in FIG. 2. The view is similar to that shown in FIG. 3 taken along line 3—3 of FIG. 1 except that a first hip truss and a second hip truss are illustrated.

Still another multiple truss connection 45 is illustrated in FIG. 5 comprising: a support girder 2 including a wood bottom chord 3 having a front face 4; a first hip truss 5 including a wood bottom chord 6 having a bottom edge 7 and parallel first and second sides 8 and 9; a second hip truss 33 including a wood bottom chord 34 having a bottom edge 35 and parallel first and second sides 36 and 37; and a sheet metal hanger 15.

Sheet metal hanger 15 includes: a seat member 16 for receiving the bottom edges 7, and 12 of the first hip truss 5 and the first jack truss 10, a first backwall member 17 in registration with the front face 4 of the support girder 2, a first side member 18 integrally connected to the first backwall member 17 at an acute angle 19 and integrally connected to the seat member 16, and disposed for registration with the first side 8 of the first hip truss 5, a second backwall member 20 spaced from the first backwall member 17 in registration with the front face 4 of the support girder 2, and a second side member 21 integrally connected to the second backwall member 20 at an acute angle 22 and at an obtuse angle 23 with the first side member 18 and integrally connected to the seat member 16, and disposed for registration with the second side 37 of the second hip truss 33.

First fasteners 27 inserted through the first backwall member 17 into the support girder 2; second fasteners 28 inserted through the second backwall member 20 into the support girder 2; third fasteners 29 inserted through the first side member 18 into the first hip truss 5; and sixth fasteners 43 inserted through the second side member 21 into the second hip truss 33 complete the multiple truss connection 45.

Multiple truss connection 45 also includes fastener opening means 31 formed in the first backwall member, the first side member, the second backwall member, and the second side member for permitting slant angle fastening.

The present invention is not limited to a multiple truss connection, but may also be used in a multiple wood framing member connection. The description of the following multiple wood framing member connection is identical to the multiple truss connection except that standard wood framing members such as 2×6's, 2×8's or other standard size lumber may be used instead of wood trusses. No change has been made in the numbering system an no separate drawings of standard lumber have been made as the drawings in plan view would look identical.

The multiple wood framing member connection 1 includes: a support header member 2 having a front face 4; a first wood framing member 5 having a bottom edge 6 and parallel first and second sides 8 and 9; a second wood framing member 10 having a bottom edge 12 and parallel first and second sides 13 and 14; and a sheet metal hanger 15.

The sheet metal hanger 15 includes: a seat member 16 for receiving the bottom edges 7 and 12 of the first wood framing member 5 and the second wood framing member 10, a first backwall member 17 in registration with the front face 4 of the support header member 2, a first side member 18 integrally connected to the first backwall member 17 at an acute angle 19 and integrally connected to the seat member 16, a second backwall member 20 spaced from the first backwall member 17 in registration with the front face 4 of the support header member 2, a second side member 21 integrally connected to the second backwall member 20 at an acute angle 22 and at an obtuse angle 23 with the first side member 18 and integrally connected to the seat member 16, and a flange member 24 having first and second faces 25 and 26 integrally connected to the seat member 16 and extending upwardly therefrom and disposed at a right angle to the first and second back backwall members 17 and 20.

First fasteners 27 inserted through the first backwall member 17 into the support header member 2; second fasteners 28 inserted through the second backwall member 20 into the support header member 2; third fasteners 29 inserted through the sheet metal hanger 15 into the first wood framing member 5; and fourth fasteners 30 inserted through the sheet metal hanger 15 into the second wood framing member 10 complete the multiple wood framing member connection 1.

When used in a multiple truss connection, the sheet metal hanger 15 may be constructed from a sheet metal blank 46 using 14 gauge material.

Figure 6:
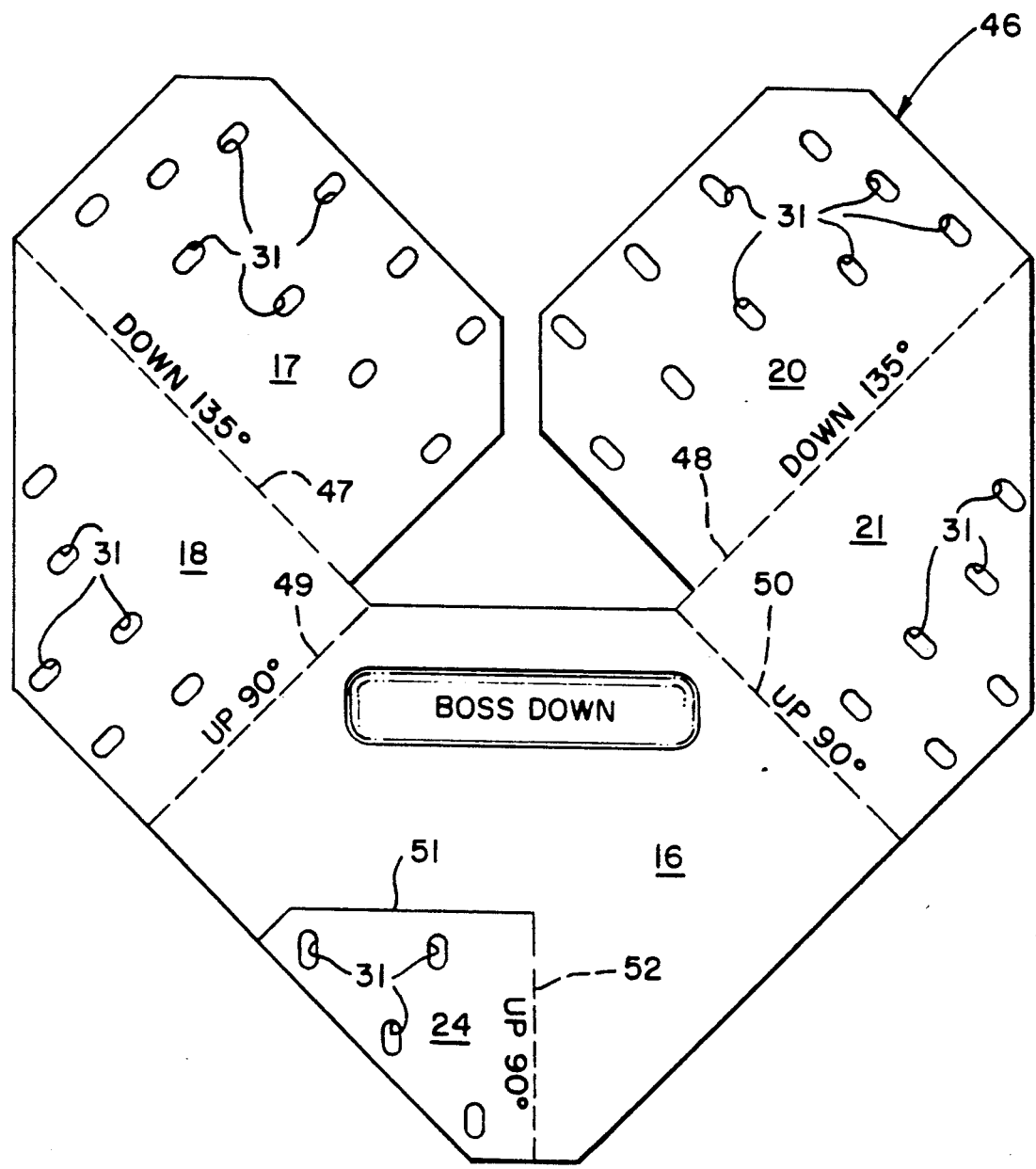
FIG. 6 is a top plan view of a sheet metal blank prior to bending from which the sheet metal hanger of the present invention illustrated in FIG. 2 is constructed.

A typical blank 46 is illustrated in FIG. 6. Progressive die machines may be used to cut and bend the blank 46 as follows: First, the blank 46 is cut from a sheet metal coil as illustrated in FIG. 6. Backwall member 17 is bent downwardly 135° along bend line 47, Second side member 20 is bent downwardly 135° along bend line 48, First side member 18 is bent up 90° along bend line 49, and second side member 21 is bent up 90° along bend line 50.

A cut 51 is made in seat member 16 and flange member 24 is bent up 90° along bend line 52.

Fastener openings 31 as illustrated in the drawings are obround openings and the structure and function of the openings is fully described in Gilb, U.S. Pat. No. 4,230,416. Another way of constructing the openings 31 to permit slant fastening is described in Gilb U.S. Pat. No. 4,480,941.

The sheet metal hanger 15 of the present invention is offered commercially by Simpson Strong-Tie Company, Inc. of San Leandro, Calif. and carries the model number THJA26 Truss Hip and Jack Hanger. The sheet metal hanger is presently made of 14 gauge sheet metal and finished by galvanizing. In its final configuration, the sheet metal hanger 15 is 9" in width and 5" in height. Where Douglas Fir or Larch is used in the trusses, the allowable uplift load for the hip truss is 725 lbs and for the jack truss its 240 lbs. The hip truss has an allowable snow load of 2,330 lbs., an allowable construction load of 2,375 lbs. and an allowable wind load of 2,375 lbs. The jack truss has an allowable snow load of 775 lbs., an allowable construction load of 795 lbs. and an allowable wind load of 795 lbs.

When the trusses are constructed from spruce, pine or fir, the hip truss has an allowable uplift load of 520 lbs., an allowable snow load of 1,900 lbs, a construction allowable load of 2,060 and an allowable wind load of 2100 lbs. The jack truss has allowable loads of 175 lbs. for uplift, 630 lbs. for snow, 690 pounds for construction, and 700 lbs. for wind.

For the commercial model, the recommended fasteners are 20 16d into the truss girder, 6 10d by 1½" in length into the hip truss and 4 10d by 1½" in length into the jack truss.

Referring to the blank 46, the minimum width of the seat 16 between first side member 18 and second side member 21 is 3" and the maximum width is 7½". The first and second side members have a height of 5" and a maximum width of 3". The first and second backwall members have a width of 3" and a height of 4.7". To add rigidity to the seat member 16, one or more bosses may be stamped into the metal.

Referring to FIGS. 1 and 3, installation of the multiple truss connection 1 is as follows: Many contractors prefer to butt end 53 of first jack truss 10 up against front face 4 of support girder 2 and tack nail it. Next first hip truss 5 is placed at a 45° angle with first jack truss 10 so that a corner 54 is up against face 4 of support girder 2 and tacked to support girder 2. Next, sheet metal hanger 15 is shoved up underneath the hip and jack truss until the bottom edges 7 and 11 are in registration with seat 16 of sheet metal connector 15. First and Second fasteners such as nails 27 and 28 are then driven through obround openings 31 in first and second backwall members 17 and 20 into wood bottom chord 3 of support girder 2. Because of restriction caused by first hip truss 5, first fasteners are driven at an angle to the front face 4 of the wood bottom chord 3 of the support girder 2 which is roughly parallel to the wood bottom chord 6.

Second fasteners 28 are driven in like manner through fastener openings 31 in second backwall member 20 into wood bottom chord 3 of support girder 2. Third fasteners 29 are then driven through fastener openings 31 in first side member 18, at an angle to the axis of wood bottom chord 6 of first hip truss 5. The nails are driven generally parallel to the front face 4 of wood bottom chord 3 of support girder 2.

Finally, fourth fasteners 30 are driven at an angle through fastener openings 31 in flange member 24 into wood bottom chord 11 of first jack truss 10.

The greatest number of nails are driven through first side member 18 into first hip truss 5 which carries the greater load. In addition, end 55 of first hip truss 5 is wedged between first jack truss 10 and the intersection 56 of first backwall member 17 and first side member 18. First jack truss 10 is wedged between first hip truss 5 and intersection 59 of second backwall member 20 and second side member 21 of sheet metal connector 15.

It is to be understood that sheet metal connector 15 could be connected to support girder 2 and then the trusses placed on seat 16 and nailed.

Referring to FIG. 4, installation of the multiple truss connection 32 is as follows: As previously described the hip and jack truss could be first tacked to the support girder 2 and then the sheet metal hanger 15 could be shoved up from beneath. In the alternate installation, first fasteners 27 are driven through fastener openings 31 in first backwall member 17 into wood bottom chord 3 of support girder 2 at an angle. Next second fasteners 28 are driven through fastener openings 31 in second backwall member 20 and into wood bottom chord 3 of support girder 2 at an angle.

Wood bottom chord 39 of second jack truss 38 is then placed on seat 16 of sheet metal hanger 15 with end 57 butted against front face 4 of wood bottom chord 3 of support girder 2. Next wood bottom chord 34 of second hip truss 33 is placed on seat member 15 of sheet metal hanger 15 and shoved back until the edges of end 58 of of second hip truss 33 are butted up against second side 42 of second jack truss 38 and front face 4 of support girder 2.

Sixth fasteners 43 are then driven at an angle through obround openings 31 in second side member 21 into wood bottom chord 34 of second hip truss 33. Finally, fifth fasteners 44 are driven through fastener openings 31 in flange member 24 and into wood bottom chord 39 of second jack truss 38. In addition to the holding power of the fasteners set forth above, end 57 of second jack truss 38 is held securely between intersection 56 of first backwall member 17 and first side member 18 and the end 58 of second hip truss 33. Second hip truss 33 is held by sixth fasteners 43 and wedged between second jack truss 38 and the intersection 59 of second backwall member 20 and second side member 21.

Referring to FIG. 5. First and second hip trusses 5 and 33 may be tack nailed to support girder 2 and the sheet metal hanger 15 shoved up from beneath or the sheet metal hanger may first be installed and then the first and second hip trusses 5 and 33 placed thereon.

The first and second hip trusses 5 and 33 are installed exactly as set forth above and the installation procedure is not repeated. As may be seen from FIG. 5, the ends 55 and 58 of the first and second hip trusses 5 and 33 are wedged between intersections 56 and 59 of the sheet metal connector 15.

I claim:

1. A multiple truss connection comprising:
   a. a support girder including a wood bottom chord having a front face;
   b. a first truss including a wood bottom chord having a bottom edge, an end edge face, and parallel first and second sides;

c. a second truss including a wood bottom chord having a bottom edge, an end edge face and parallel first and second sides;
d. a sheet metal hanger including:
  (1) a seat member for receiving said bottom edges of said first truss and said second truss,
  (2) a first backwall member in registration with said front face of said wood bottom chord of said support girder and clear of said end edge faces of said first and second truss,
  (3) a first side member integrally connected to said first backwall member at an acute angle and integrally connected to said seat member,
  (4) a second backwall member laterally spaced from said first backwall member in registration with said front face of said wood bottom chord of said support girder and clear of said end edge faces of said first and second truss,
  (5) a second side member integrally connected to said second backwall member at an acute angle and at an obtuse angle with said first side member and integrally connected to said seat member,
  (6) a flange member having first and second faces integrally connected to said seat member and extending upwardly therefrom and disposed at a right angle to said first and second back backwall members,
e. said end edge face of said first truss is mounted in abutment with said front face of said support girder;
f. said end edge face of said second truss is mounted in abutment with said front face of said support girder;
g. first nail or screw fasteners inserted through said first backwall member into said wood bottom chord of said support girder;
h. second nail or screw fasteners inserted through said second backwall member into said wood bottom chord of said support girder;
i. third fasteners inserted through said sheet metal hanger into said first truss; and
j. fourth fasteners inserted through said sheet metal hanger into said second truss.

2. A multiple truss connection comprising:
a. a support girder including a wood bottom chord having a front face;
b. a first hip truss including a wood bottom chord having a bottom edge, an end edge face, and parallel first and second sides;
c. a first jack truss including a wood bottom chord having a bottom edge, an end edge face, and parallel first and second sides;
d. a sheet metal hanger including:
  (1) a seat member for receiving said bottom edges of said first hip truss and said first jack truss,
  (2) a first back wall member in registration with said front face of said wood bottom chord of said support girder and clear of said end edge faces of said first hip truss and said first jack truss,
  (3) a first side member integrally connected to said first backwall member at an acute angle and integrally connected to said seat member, and disposed for registration with said first side of said first hip truss,
  (4) a second backwall member laterally spaced from said first backwall member in registration with said wood bottom chord of said front face of said support girder and clear of said end edge faces of said first hip truss and said first jack truss,
  (5) a second side member integrally connected to said second backwall member at an acute angle and at an obtuse angle with said first side member and integrally connected to said seat member,
  (6) a flange member having first and second faces integrally connected to said seat member and extending upwardly therefrom and located for registration of said second face with said first side of said first jack truss,
e. said end edge face of said first hip truss is mounted in abutment with said front face of said support girder;
f. said end edge face of said first jack truss is mounted in abutment with said front face of said support girder;
g. first nail or screw fasteners inserted through said first backwall member into said wood bottom chord of said support girder;
h. second nail or screw fasteners inserted through said second backwall member into said wood bottom chord of said support girder;
i. third fasteners inserted through said first side member into said first hip truss; and
j. fourth fasteners inserted through said flange member into said first jack truss.

3. A multiple truss connection as described in claim 1 comprising:
a. fastener opening means formed in said first backwall member, said first side member, said second backwall member, and said flange member for permitting slant angle fastening.

4. A multiple truss connection comprising:
a. a support girder including a wood bottom chord having a front face;
b. a second hip truss including a wood bottom chord having a bottom edge, an end edge face, and parallel first and second sides;
c. a second jack truss including a wood bottom chord having a bottom edge, an end edge face, and parallel first and second sides;
d. a sheet metal hanger including:
  (1) a seat member for receiving said bottom edges of said second hip truss and said second jack truss,
  (2) a first backwall member in registration with said front face of said wood bottom chord of said support girder and clear of said end edge face of said second hip truss and said second jack truss,
  (3) a first side member integrally connected to said first backwall member at an acute angle and integrally connected to said seat member,
  (4) a second backwall member spaced from said first backwall member in registration with said front face of said wood bottom chord of said support girder and clear of said end edge face of said second hip truss and said second jack truss,
  (5) a second side member integrally connected to said second backwall member at an acute angle and at an obtuse angle with said first side member and integrally connected to said seat member and disposed for registration with said second side of said second hip truss,
  (6) a flange member having first and second faces integrally connected to said seat member and extending upwardly therefrom and located for registration of said first face with said second side of said second jack truss, e. first nail or screw fasteners inserted through said first backwall member into wood bottom chord of said support girder;

f. second nail or screw fasteners inserted through said second backwall member into said wood bottom chord of said support girder;

g. sixth fasteners inserted through said second side member into said second hip truss; and h. fifth fasteners inserted through said flange member into said second jack truss.

5. A multiple truss connection as described in claim 3 comprising:
   a. fastener opening means formed in said first backwall member, said second side member, said second backwall member, and said flange member for permitting slant angle fastening.

6. A multiple truss connection comprising:
   a. a support girder including a wood bottom chord having a front face;
   b. a first hip truss including a wood bottom chord having a bottom edge, an end edge face, and parallel first and second sides;
   c. a second hip truss including a wood bottom chord having a bottom edge, an end edge face, and parallel first and second sides;
   d. a sheet metal hanger including:
      (1) a seat member for receiving said bottom edges of said first hip truss and said first jack truss,
      (2) a first backwall member in registration with said front face of said wood bottom chord of said support girder and clear of said end edge face of said first hip truss and said second hip truss,
      (3) a first side member integrally connected to said first backwall member at an acute angle and integrally connected to said seat member, and disposed for registration with said first side of said first hip truss,
      (4) a second backwall member spaced from said first backwall member in registration with said front face of said wood bottom chord of said support girder and clear of said end edge face of said first hip truss and said second hip truss,
      (5) a second side member integrally connected to said second backwall member at an acute angle and at an obtuse angle with said first side member and integrally connected to said seat member, and disposed for registration with said second side of said second hip truss,
   e. first nail or screw fasteners inserted through said first backwall member into said wood bottom chord of said support girder;
   f. second nail or screw fasteners inserted through said second backwall member into said wood bottom chord of said support girder;
   g. third fasteners inserted through said first side member into said first hip truss; and
   h. sixth fasteners inserted through said second side member into said second hip truss.

7. A multiple truss connection as described in claim 5 comprising:
   a. fastener opening means formed in said first backwall member, said first side member, said second backwall member, and said second side member for permitting slant angle fastening.

8. A multiple wood framing member connection comprising:
   a. a support header member having a front face;
   b. a first wood framing member having a bottom edge, an end edge face, and parallel first and second sides;
   c. a second wood framing member having a bottom edge, an end edge face, and parallel first and second sides;
   d. a sheet metal hanger including:
      (1) a seat member for receiving said bottom edges of said first wood framing member and said second wood framing member,
      (2) a first backwall member in registration with said front face of said support header member and clear of said end edge faces of said first and second wood framing members,
      (3) a first side member integrally connected to said first backwall member at an acute angle and integrally connected to said seat member,
      (4) a second backwall member spaced from said first backwall member in registration with said front face of said support header member and clear of said end edge faces of said first and second wood framing members,
      (5) a second side member integrally connected to said second backwall member at an acute angle and at an obtuse angle with said first side member and integrally connected to said seat member,
      (6) a flange member having first and second faces integrally connected to said seat member and extending upwardly therefrom and disposed at a right angle to said first and second back backwall members,
   said end edge face of said first wood framing member is mounted in abutment with said front face of said support header member;
   f. said end edge face of said second wood framing member is mounted in abutment with said front face of said support header member;
   g. first fasteners inserted through said first backwall member into said support header member;
   h. second fasteners inserted through said second backwall member into said support header member;
   i. third fasteners inserted through said sheet metal hanger into said first wood framing member; and
   j. fourth fasteners inserted through said sheet metal hanger into said second wood framing member.

* * * * *